United States Patent
Terada

(10) Patent No.: US 7,903,346 B2
(45) Date of Patent: Mar. 8, 2011

(54) LENS APPARATUS AND IMAGE PICKUP APPARATUS

(75) Inventor: Shuichi Terada, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/559,100

(22) Filed: Sep. 14, 2009

(65) Prior Publication Data

US 2010/0067127 A1    Mar. 18, 2010

(30) Foreign Application Priority Data

Sep. 16, 2008   (JP) ................................. 2008-236688

(51) Int. Cl.
   *G02B 15/14*   (2006.01)
(52) U.S. Cl. .......................... 359/699; 359/694; 359/701
(58) Field of Classification Search .......... 359/694–704, 359/823, 824; 396/72–75, 350, 544
   See application file for complete search history.

(56) References Cited

U.S. PATENT DOCUMENTS

| 4,386,829 | A  | * | 6/1983 | Sumi ............................. 359/699 |
| 7,230,773 | B2 | * | 6/2007 | Nomura et al. ............... 359/696 |
| 7,546,029 | B2 | * | 6/2009 | Ishizuka et al. ............... 396/73 |

FOREIGN PATENT DOCUMENTS

| JP | 2006-189617 | 7/2006 |
| JP | 2008-058581 | 3/2008 |

* cited by examiner

*Primary Examiner* — Loha Ben
(74) *Attorney, Agent, or Firm* — Cowan, Liebowitz & Latman, P.C.

(57) ABSTRACT

The lens apparatus includes a first barrel member, a second barrel member, a first rolling bearing and a second rolling bearing. The second barrel member includes a cam for moving a lens unit in an optical axis direction, is disposed inside or outside the first barrel member and rotatable around an optical axis with respect to the first barrel member. The first rolling bearing prevents relative displacements of the first and second barrel members in the optical axis direction and in a radial direction. The first rolling bearing is rotatable between the first and second barrel members. The second rolling bearing prevents the relative displacement of the first and second barrel members in the radial direction. The second rolling bearing is rotatable between the first and second barrel members. The first and second rolling bearing are arranged at positions away from each other in the optical axis direction.

7 Claims, 15 Drawing Sheets

LENS APPARATUS AND IMAGE PICKUP APPARATUS

BACKGROUND OF THE INVENTION

The present invention relates to a lens apparatus configured to move a lens in an optical axis direction and an image pickup apparatus such as a digital camera including the lens apparatus.

Mechanisms each moving a lens in an optical axis direction in a lens barrel (lens apparatus) used for a digital camera generally include, as disclosed in, for example, Japanese Patent Laid-Open No. 2008-058581, a cam barrel having a cam groove, and a lens holder holding the lens and having a cam pin that engages with the cam groove.

More specifically, the cam barrel is rotatably disposed inside a straight-movable barrel, and the cam pin of the lens holder engages with the cam groove formed on an inner circumferential surface of the cam barrel and a straight groove formed on the straight-movable barrel. Rotation of the cam barrel moves the cam pin of the lens holder in the optical axis direction by lift of the cam groove with being guided by the straight groove, which moves the lens together with the lens holder in the optical axis direction.

Moreover, Japanese Patent Laid-Open No. 2006-189617 discloses a lens barrel in which steel balls are disposed between barrel members relatively moving in an optical axis direction in order to remove a backlash therebetween in their radial direction.

However, in the lens barrel disclosed in Japanese Patent Laid-Open No. 2008-058581, the inner circumferential surface of the cam barrel and an outer circumferential surface of the straight-movable barrel relatively slide. In this case, a sliding area increases, and thereby sliding noise generated when the lens barrel is driven becomes large.

Further, it is necessary to give a gap between the cam barrel and the straight-movable barrel in the radial direction in order to allow manufacturing errors. The gap deteriorates positional accuracy of the lens. Reduction of the gap for improving the positional accuracy of the lens increases a driving load, thereby resulting in increase in size of an actuator such as a motor rotating the cam barrel.

SUMMARY OF THE INVENTION

The present invention provides a lens apparatus capable of reducing driving noise generated in a mechanism in which relative rotation of a straight-movable barrel and a cam barrel moves a lens in an optical axis direction and of improving positional accuracy of the lens while suppressing increase in driving load, and provides an image pickup apparatus including the lens apparatus.

The present invention provides as one aspect thereof a lens apparatus including a first barrel member, a second barrel member, a first rolling bearing and a second rolling bearing. The second barrel member includes a cam for moving a lens unit in an optical axis direction, is disposed inside or outside of the first barrel member and is rotatable around an optical axis with respect to the first barrel member. The first rolling bearing is configured to prevent relative displacements of the first and second barrel members in the optical axis direction and in a radial direction. The first rolling bearing is rotatable between the first and second barrel members. The second rolling bearing is configured to prevent the relative displacement of the first and second barrel members in the radial direction. The second rolling bearing is rotatable between the first and second barrel members. The first rolling bearing and the second rolling bearing are arranged at positions away from each other in the optical axis direction between the first and second barrel members.

The present invention provides as another aspect thereof an image pickup apparatus including the lens apparatus.

Other aspects of the present invention will become apparent from the following description and the attached drawings.

DESCRIPTION OF THE EMBODIMENTS

Exemplary embodiments of the present invention will be described hereinafter with reference to the accompanying drawings.

Figure 2:
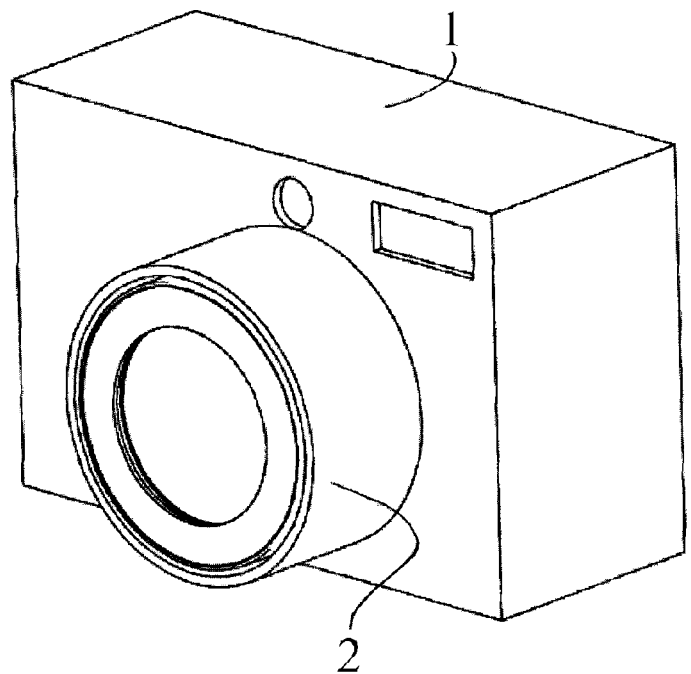
FIG. 2 is a perspective view of a camera having the lens barrel of the embodiment.
Figure 3:
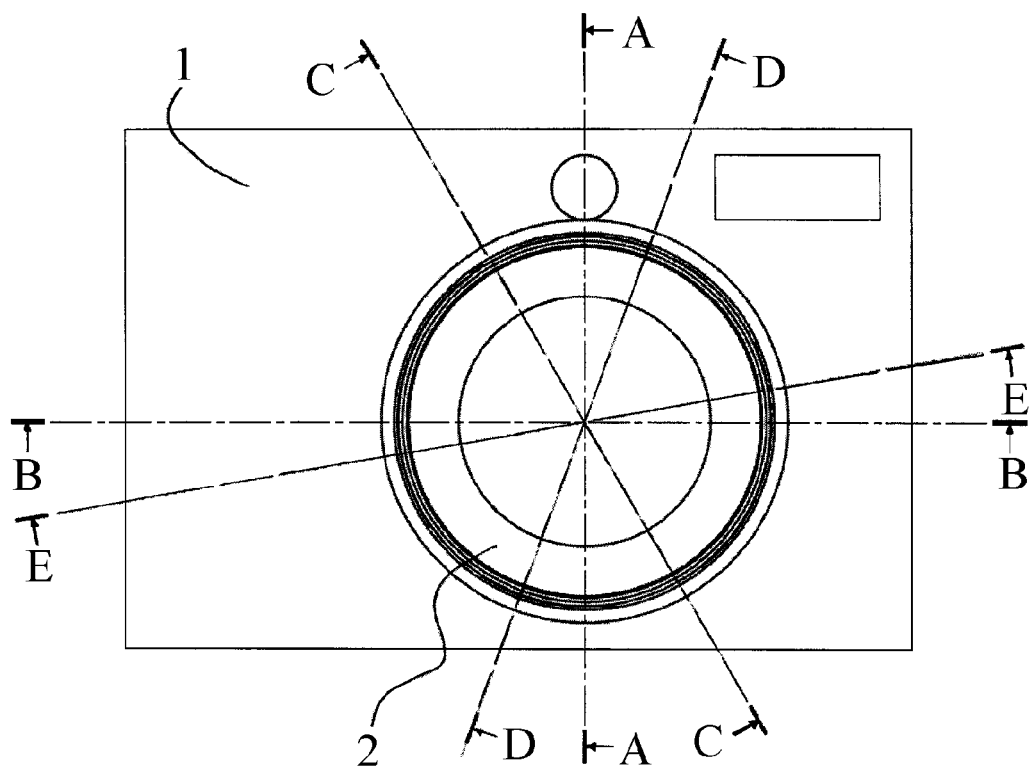
FIG. 3 is a front view of the camera shown in FIG. 2.

FIG. 2 shows an overview of a camera (image pickup apparatus) 1 on which a lens apparatus of an embodiment of the present invention is mounted. FIG. 3 is a front view of the camera.

Figure 5:
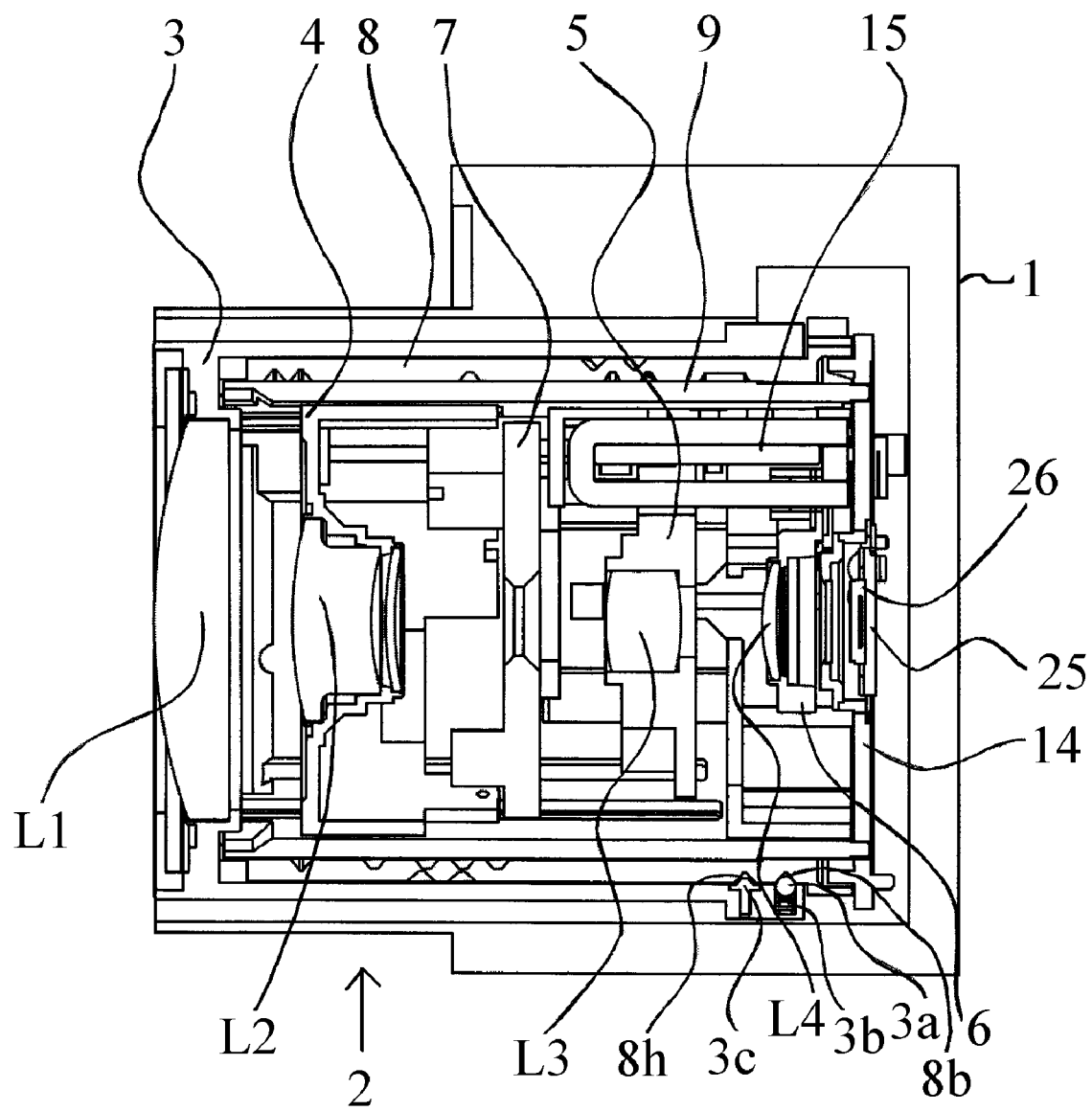
FIG. 5 is a sectional view showing an A-A section of the lens barrel of the embodiment in a retracted state.

A retractable lens barrel (lens apparatus) 2 is mounted to a front face of the camera 1. The lens barrel 2 houses an image pickup optical system that includes, as shown in FIG. 5, in order from an object side to an image plane side, a first lens unit L1, a second lens unit L2, a third lens unit L3 and a fourth lens unit L4. The fourth lens unit L4 is moved for focusing in a direction in which an optical axis of the image pickup optical system extends (hereinafter referred to as "optical axis direction").

Figure 6:
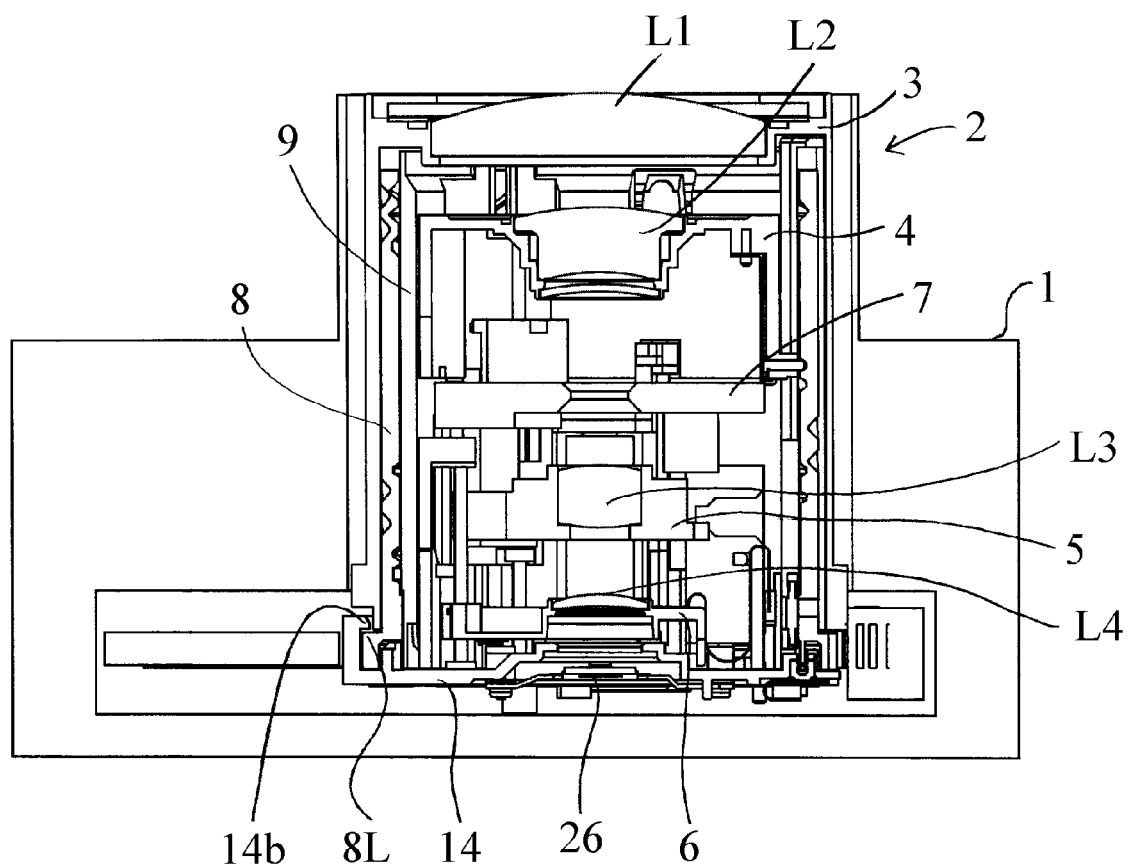
FIG. 6 is a sectional view showing a B-B section of the lens barrel of the embodiment in the retracted state.
Figure 7:
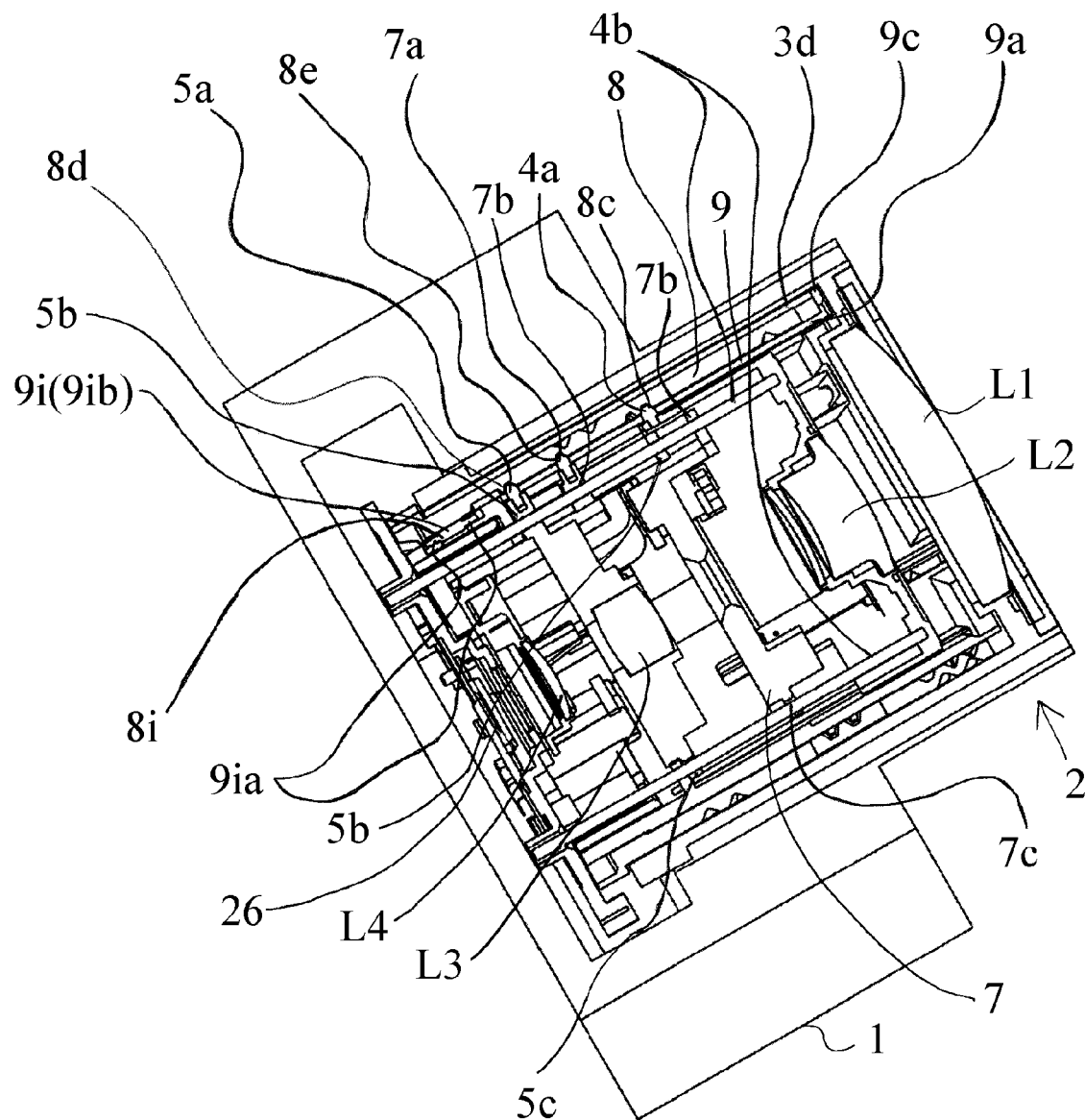
FIG. 7 is a sectional view showing a C-C section of the lens barrel of the embodiment in the retracted state.
Figure 8:
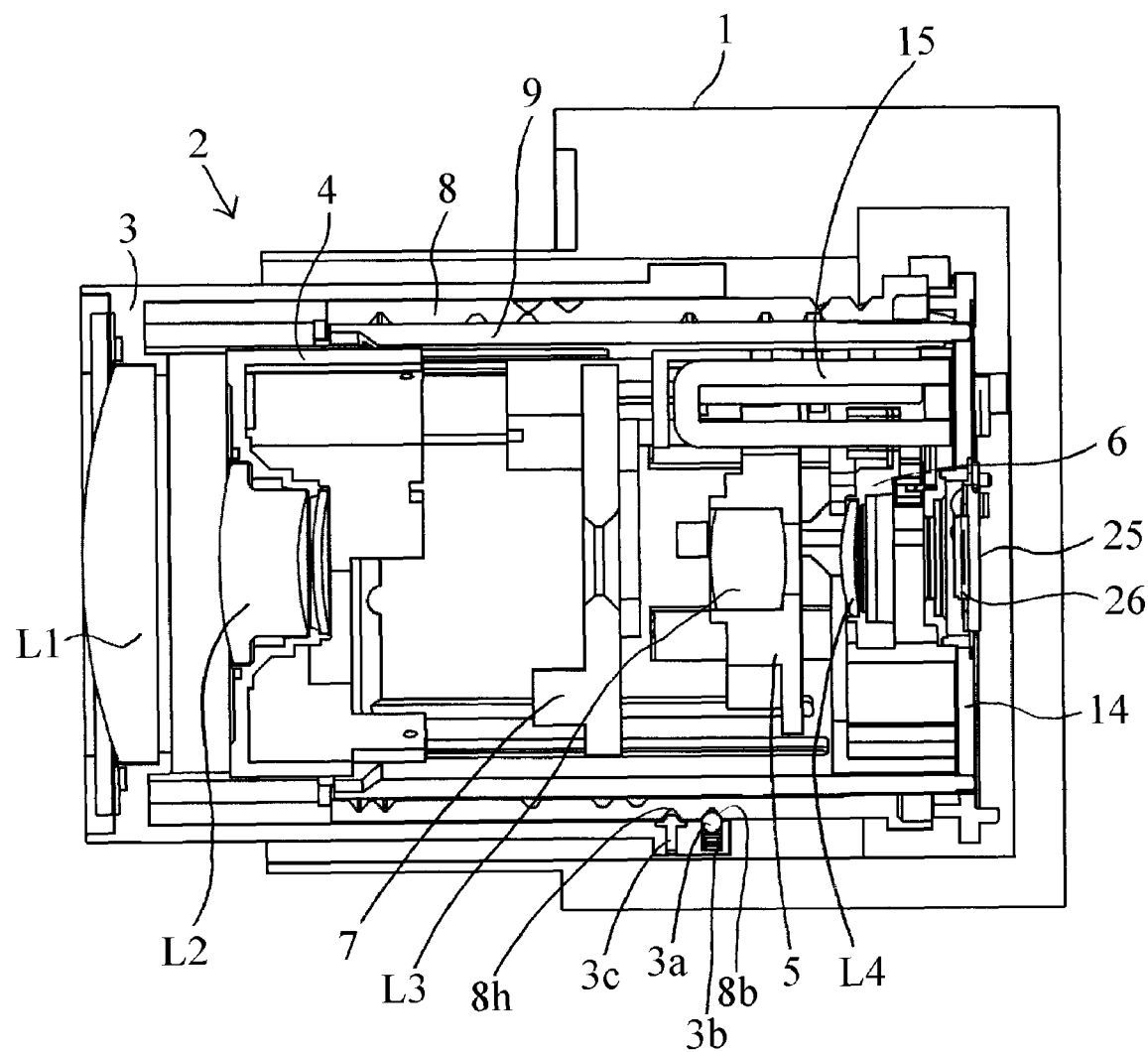
FIG. 8 is a sectional view showing the A-A section of the lens barrel of the embodiment in a wide-angle state.
Figure 9:
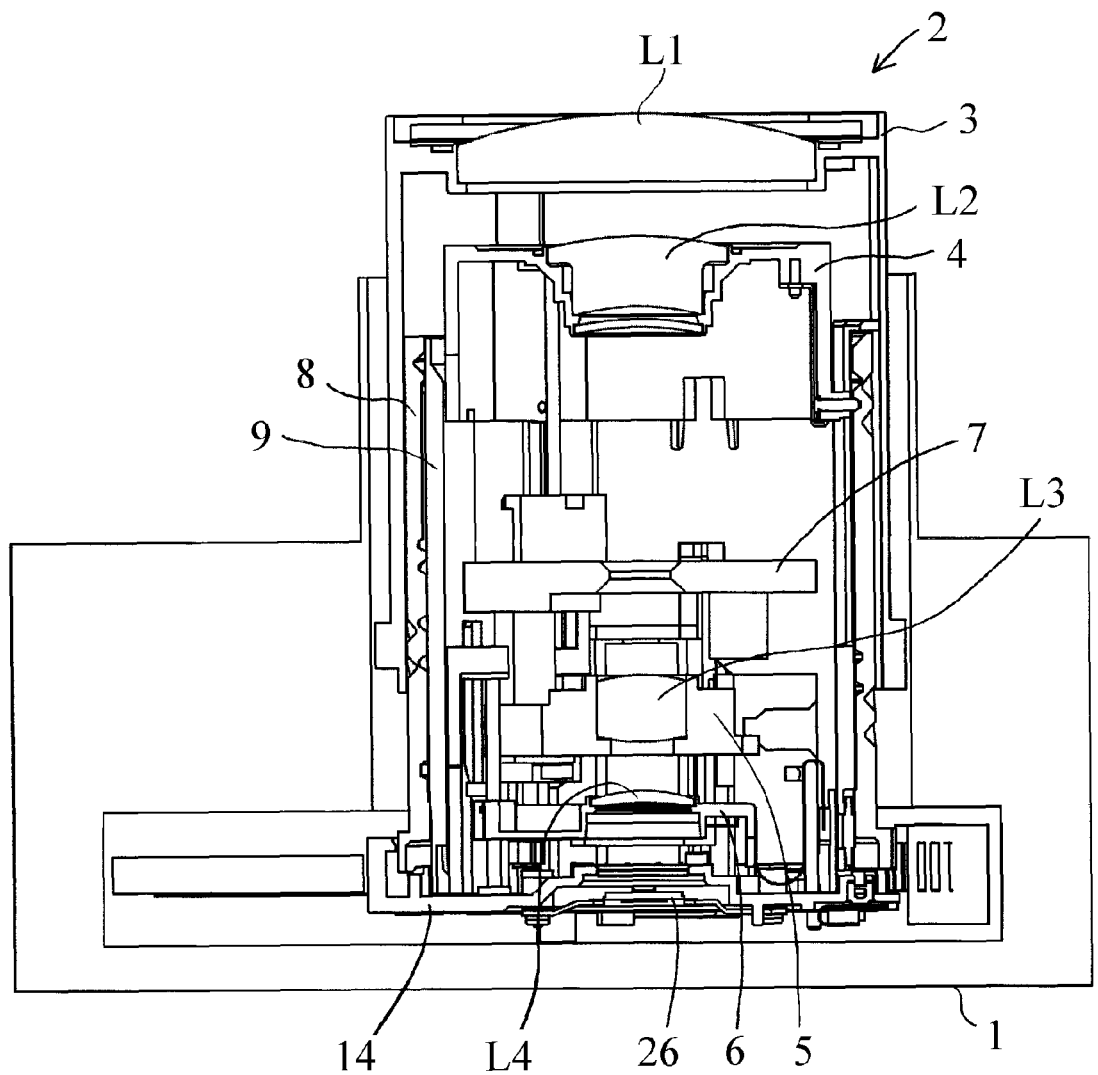
FIG. 9 is a sectional view showing the B-B section of the lens barrel of the embodiment in the wide-angle state.
Figure 10:
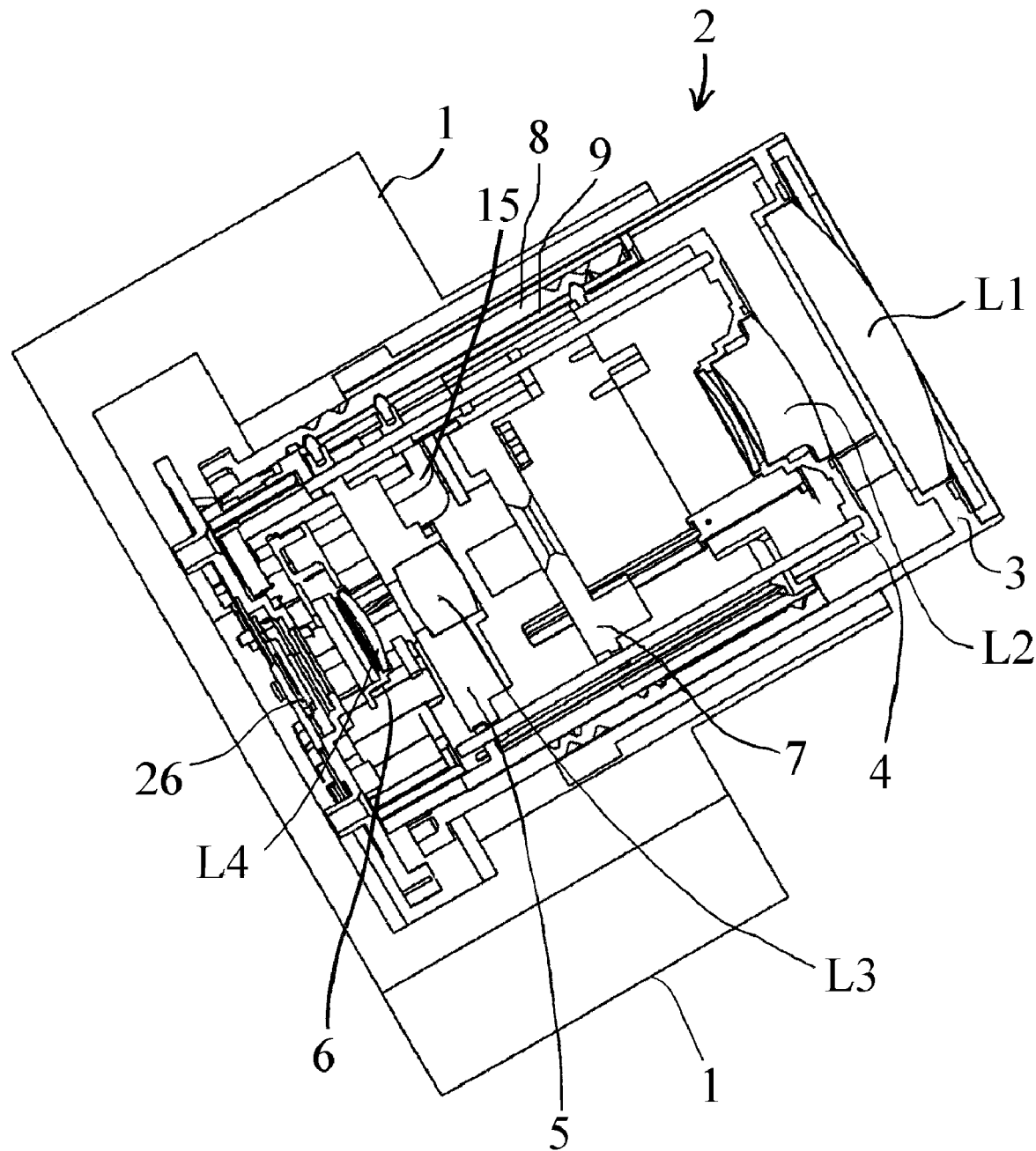
FIG. 10 is a sectional view showing the C-C section of the lens barrel of the embodiment in the wide-angle state.
Figure 11:
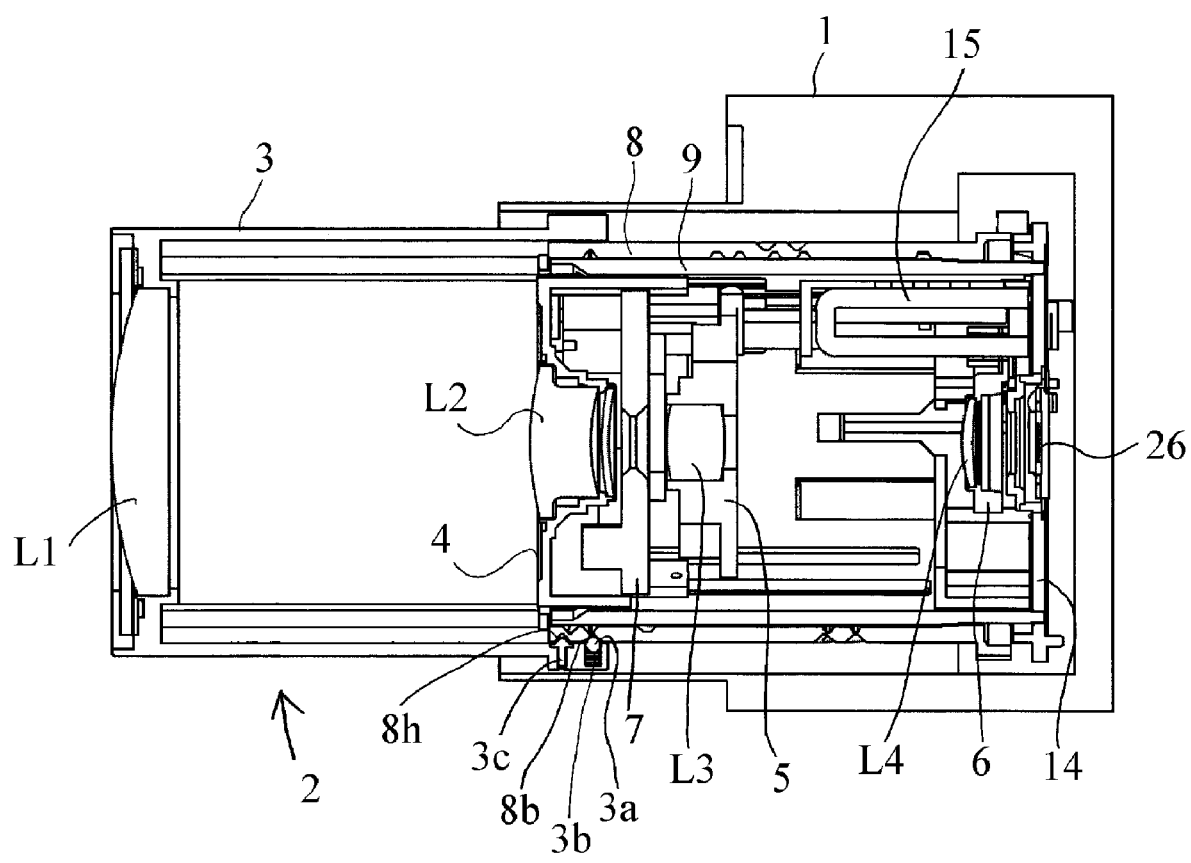
FIG. 11 is a sectional view showing the A-A section of the lens barrel of the embodiment in a telephoto state.
Figure 12:
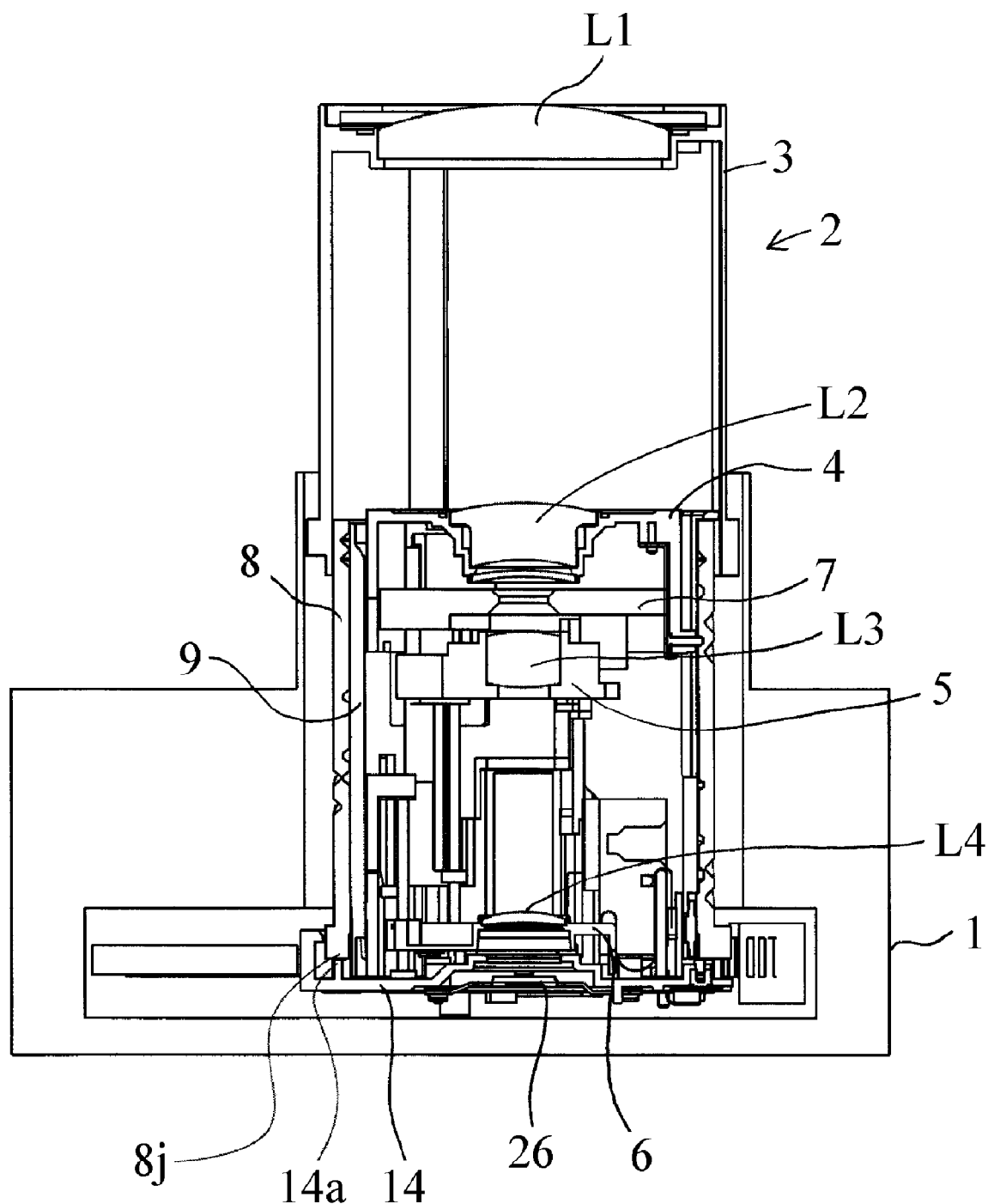
FIG. 12 is a sectional view showing the B-B section of the lens barrel of the embodiment in the telephoto state.
Figure 13:
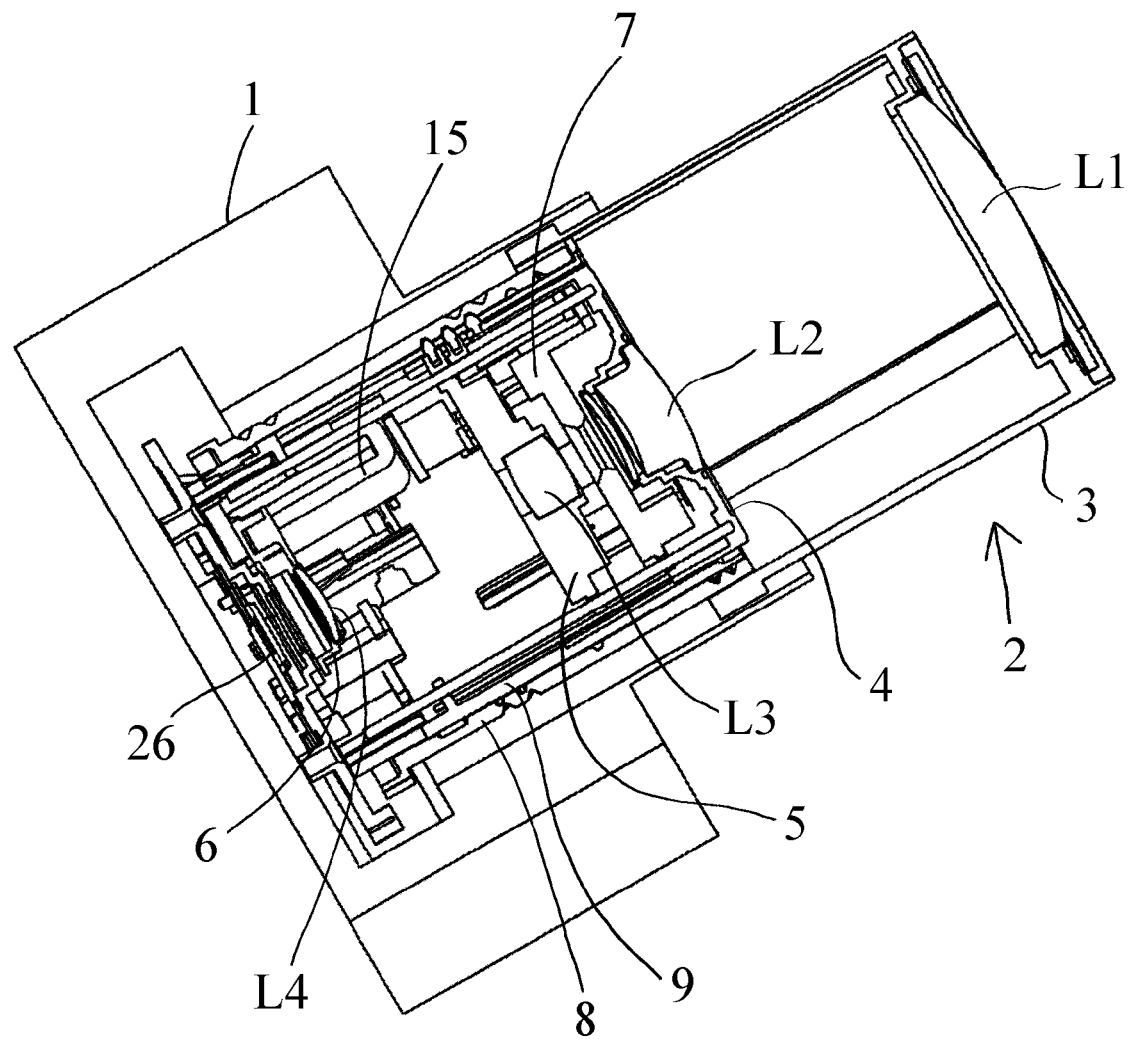
FIG. 13 is a sectional view showing the C-C section of the lens barrel of the embodiment in the telephoto state.

FIGS. 5, 6 and 7 respectively show sections of an internal structure of the lens barrel 2 cut by A-A, B-B and C-C lines shown in FIG. 3 in a retracted state. FIGS. 8, 9 and 10 respectively show sections of the internal structure of the lens barrel 2 cut by the A-A, B-B and C-C lines in a wide-angle state that is an initial state of an image pickup state. FIGS. 11, 12 and 13 respectively show sections of the internal structure of the lens barrel 2 cut by the A-A, B-B and C-C lines in a telephoto state. The image pickup state includes states from the wide-angle state to the telephoto state.

Figure 14:
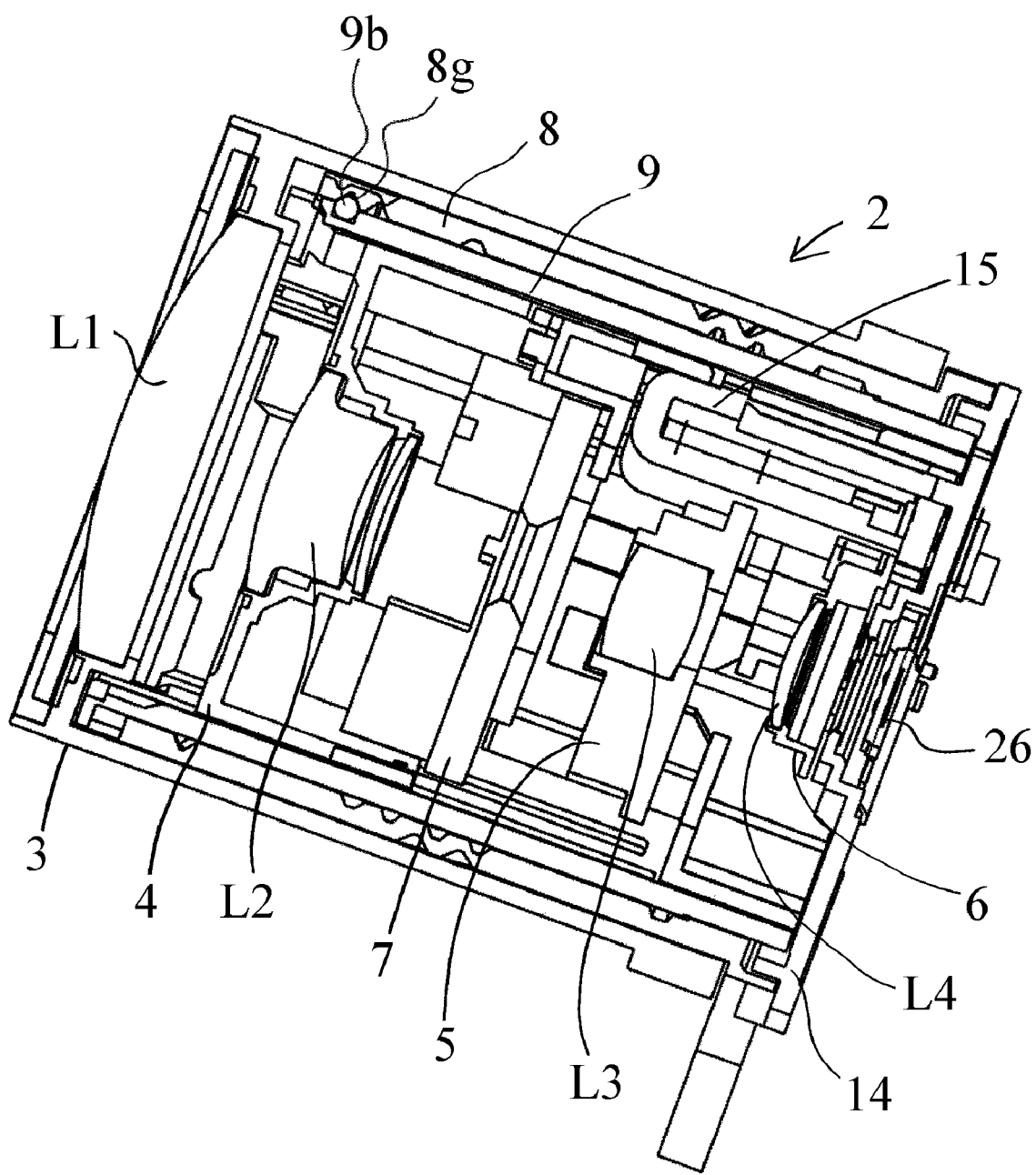
FIG. 14 is a sectional view showing a D-D section of the lens barrel of the embodiment in the retracted state.
Figure 15:
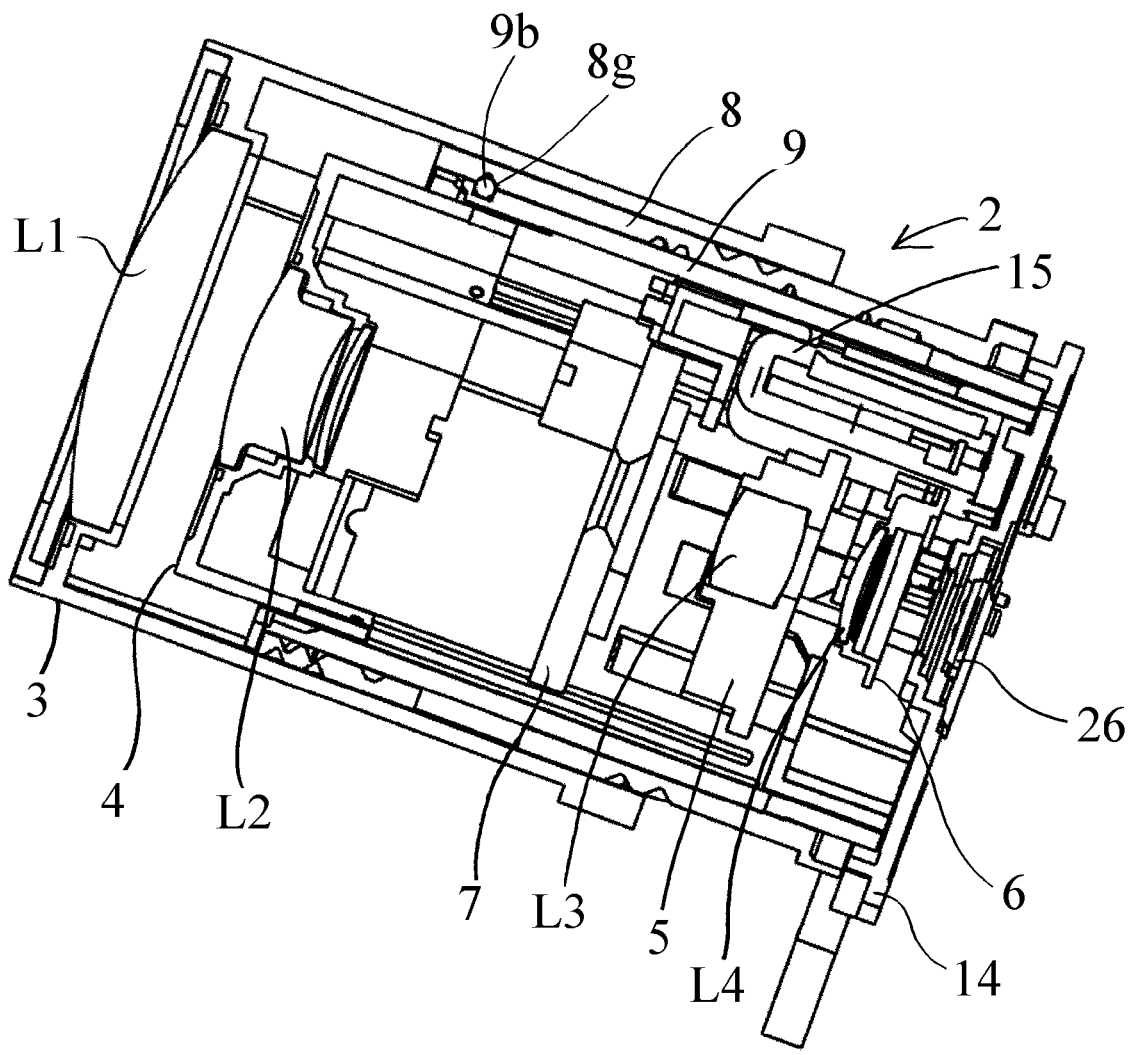
FIG. 15 is a sectional view showing the D-D section of the lens barrel of the embodiment in the wide-angle state.

FIGS. 14 and 15 respectively show sections of the internal structure of the lens barrel 2 cut by a D-D line shown in FIG. 3 in the retracted state and the wide-angle state.

In these figures, the first lens unit L1 is held by a first lens holder 3. The first lens holder 3 includes first ball followers 3a, first ball springs 3b, first impact pins 3c and first straight groove portions 3d which are arranged or formed at three places in a circumferential direction.

The second lens unit L2 is held by a second lens holder 4. The second lens holder 4 is provided with second cam pins 4a. The second lens holder 4 holds one end of each of two guide bars 4b extending in the optical axis direction.

The third lens unit L3 is held by a third lens holder 5. The third lens holder 5 includes third cam pins 5a, a sleeve portion 5b engaging with one guide bar 4b so as to be movable in the optical axis direction and a U-shaped groove portion 5c engaging with the other guide bar 4b for preventing rotation of the third lens holder 5 around the one guide bar 4b.

The fourth lens unit L4 is held by a fourth lens holder 6.

A shutter unit 7 includes SH cam pins 7a, a sleeve portion 7b engaging with the one guide bar 4b so as to be movable in the optical axis direction and a U-shaped groove portion 7c engaging with the other guide bar 4b for preventing rotation of the shutter unit 7 around the one guide bar 4b.

A cam barrel 8 and a fixed barrel 9 which is a straight-guiding barrel are disposed inside the first lens holder 3 and outside the second lens holder 4. The fixed barrel 9 corresponds to a first barrel member, and the cam barrel 8 corresponds to a second barrel member. The fixed barrel 9 corresponds to one barrel member of the first and second barrel members, and the cam barrel 8 corresponds to another barrel member of the first and second barrel members.

The cam barrel 8 is rotatable around the optical axis at an outside of the fixed barrel 9. A gear portion 8a, first cam groove portions (cams) 8b and first impact receiving groove portions 8h are formed on an outer circumferential part of the cam barrel 8. Second cam groove portions (cams) 8c, third cam groove portions (cams) 8d, SH cam groove portions 8e, cam barrel driving cam groove portions 8g and roller guiding portions 8i are formed on an inner circumferential part of the cam barrel 8.

In FIG. 12, the cam barrel 8 includes a cam barrel impact receiving portion 8j formed at a portion facing an image pickup element holder 14.

Figure 17:
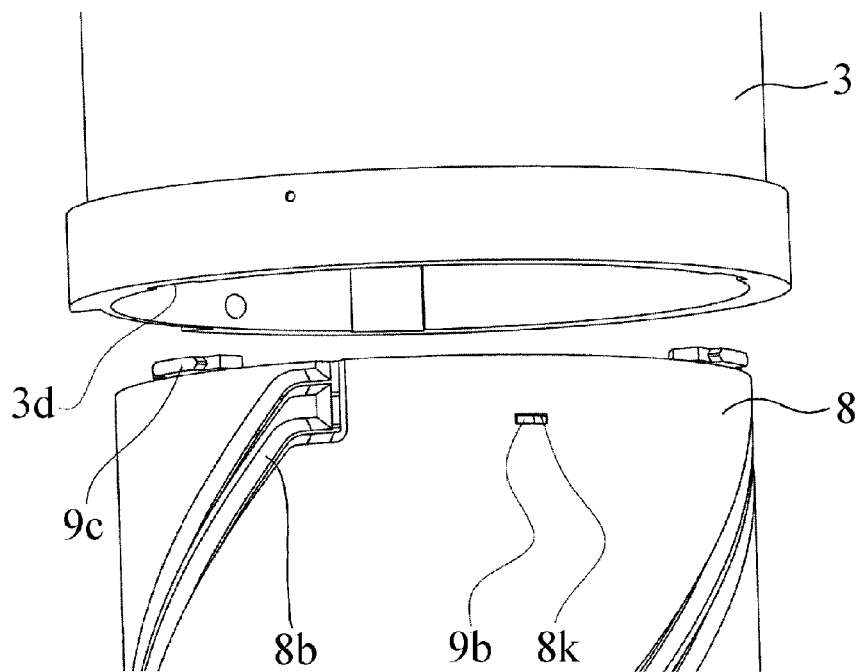
FIG. 17 is a perspective view of a ball confirmation window formed on the cam barrel in the lens barrel of the embodiment.
Figure 18:
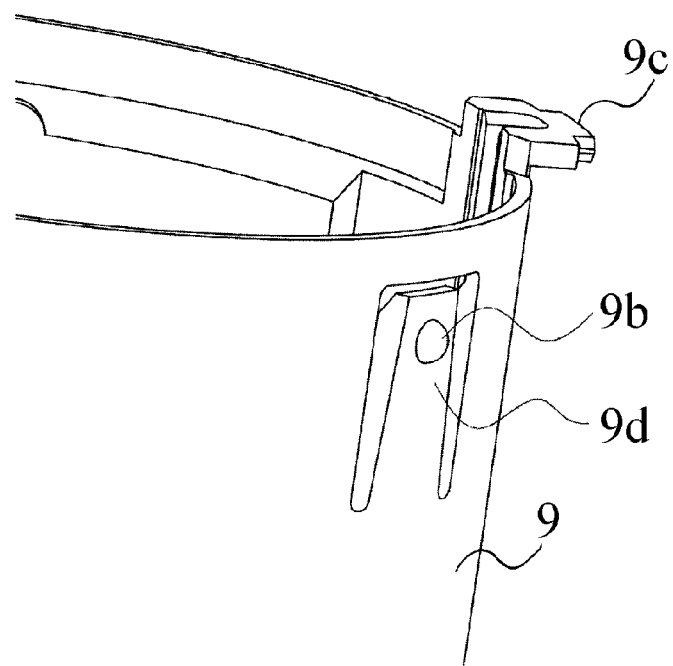
FIG. 18 is a perspective view of the fixed barrel ball follower and a fixed barrel ball spring in the embodiment.

In FIG. 17, in a bottom surface of the cam barrel driving cam groove portion 8g, a fixed barrel ball follower window 8k is formed.

Moreover, in FIG. 6, a cam barrel disengagement prevention stopper 8L is formed on the outer circumferential part of the cam barrel 8.

Each first ball follower 3a which is biased by a biasing force of each first ball spring 3b engages with each first cam groove portion 8b. In a normal drive state, each first impact pin 3c is inserted into each first impact receiving groove portion 8h with a predetermined gap therebetween.

On a circumferential wall of the fixed barrel 9, three second straight groove portions 9a extending in the optical axis direction and penetrating through the circumferential wall in a radial direction which is a direction orthogonal to the optical axis are formed at three places in the circumferential direction. At three object side end positions whose phases are equal to those of the second straight groove portions 9a on an outer circumferential part of the fixed barrel 9, first straight-guiding keys 9c are formed. Each second cam pin 4a engages with each second straight groove portion 9a. Each first straight-guiding key 9c engages with the first straight groove portion 3d of the first lens holder 3.

As shown in FIGS. 14 through 18, three fixed barrel ball followers 9b are rotatably attached to three places in the circumferential direction on the outer circumferential part of the fixed barrel 9. At least one of the three fixed barrel ball followers 9b is biased by a fixed barrel ball spring portion 9d as a biasing member to be pressed against the cam barrel driving cam groove portion 8g of the cam barrel 8, and the other fixed barrel ball followers 9b are pressed against the cam barrel drive cam groove portions 8g by a reaction force thereof.

Reference numeral 9i denotes rollers made of an elastic material such as polyacetal. Each roller 9i has a pair of shaft portions 9ia formed at both sides in its longitudinal direction and a drum portion 9ib whose diameter is larger than that of the shaft portion 9ia. The shaft portions 9ia are rotatably supported by the fixed barrel 9. The drum portion 9ib is in contact with the roller guiding portion 8i of the cam barrel 8 to support the cam barrel 8 rotatably around the optical axis outside the fixed barrel 9.

Figure 1:
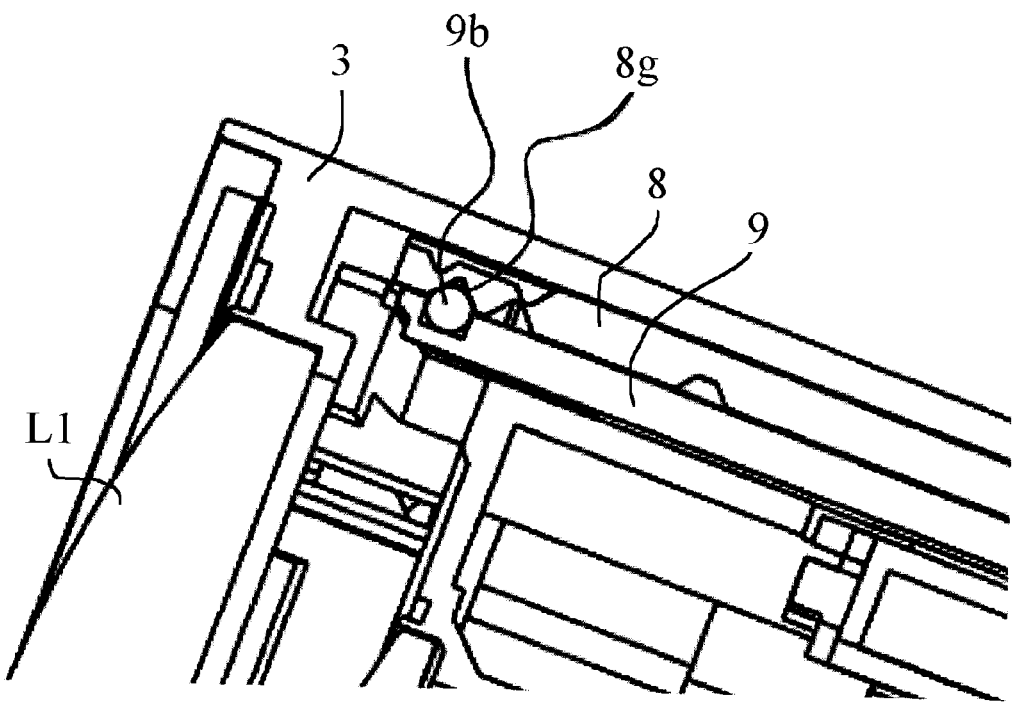
FIG. 1 is an enlarged sectional view showing arrangement of a cam barrel drive cam groove portion and a fixed barrel ball follower in a lens barrel that is an embodiment of the present invention.

As enlarged and shown in FIG. 1, to an object side part of the cam barrel 8, the fixed barrel ball followers 9b are provided as ball bearings (first rolling bearings) for the cam barrel 8 for the optical axis direction (thrust direction) and the radial direction (diameter direction). In other words, each fixed barrel ball follower 9b engages with the cam barrel driving cam groove portion 8g in the optical axis and radial directions, and supports the cam barrel 8 rotatably around the optical axis with respect to the fixed barrel 9 while preventing backlashes (relative displacements) in the optical axis and radial directions between the cam barrel 8 and the fixed barrel 9.

Moreover, to an image plane side part of the cam barrel 8, the rollers 9i are provided as roller bearings (second rolling bearings) for the cam barrel 8 for the radial direction. In other words, each roller 9i supports the cam barrel 8 rotatably around the optical axis with respect to the fixed barrel 9 while preventing the backlash (relative displacement) in the radial direction between the cam barrel 8 and the fixed barrel 9.

As described above, this embodiment arranges, between the cam barrel 8 and the fixed barrel 9, a group of the fixed barrel ball followers 9b and a group of the rollers 9i at positions away from each other in the optical axis direction. In this arrangement, the cam barrel 8 is supported at the outside of the fixed barrel 9 so as to be rotatable around the optical axis and movable in the optical axis direction in a state where backlashes of the cam barrel 8 in the optical axis and radial directions with respect to the fixed barrel 9 are suppressed.

Further, this embodiment allows rotations of the fixed barrel ball followers 9b and the rollers 9i with respect to the cam barrel 8 and the fixed barrel 9. In addition, since the diameter of the shaft portion 9ia of the roller 9i is smaller than that of the drum portion 9ib, this embodiment can reduce rotational friction between the roller 9i and the fixed barrel 9. Therefore, this embodiment can reduce rotational driving load and sliding noise (driving noise) generated when the cam barrel 8 is rotated with respect to the fixed barrel 9.

In addition, the shaft portion 9*ia* as a biasing member which is thinner than the drum portion 9*ib* elastically deforms to press the drum portion 9*ib* against the roller guiding portion 8*i* by a biasing force generated by the deformation, which can absorb a backlash caused between the fixed barrel 9 and the cam barrel 8 in the radial direction due to manufacturing errors thereof.

Moreover, applying oil on the shaft portion 9*ia* of the roller 9*i* enables suppression of increase in driving load due to friction between the shaft portion 9*ia* and the fixed barrel 9.

The cam barrel 8 moves in the optical axis direction by lift of the cam barrel driving cam groove portion 8*g* with which the fixed barrel ball follower 9*b* engages between the retracted state shown in FIG. 14 and the wide-angle state shown in FIG. 15 with rotation around the optical axis. The roller guiding portion 8*i* of the cam barrel 8 is in contact with the drum portion 9*ib* of the roller 9*i* so as to allow relative movement thereof in the optical axis direction, which makes it possible to reduce a length of the lens barrel in the optical axis direction in the retracted state.

The cam barrel 8 does not move in the optical axis direction between the telephoto state and the wide-angle state, and a lead angle of the cam barrel driving cam groove portion 8*g* (hereinafter referred to as "cam barrel lead angle") with respect to the optical axis direction between these states is 90 degrees. Since a longitudinal axis (rotation center axis) of the roller 9*i* extends in a direction orthogonal to a direction of the cam barrel lead angle between the telephoto state and the wide-angle state, the rotation of the cam barrel 8 rotates the roller 9*i*, but does not cause relative movement of the cam barrel 8 and the roller 9*i* with friction in the optical axis direction. This can suppress increase in driving load for the cam barrel 8.

Figure 4:
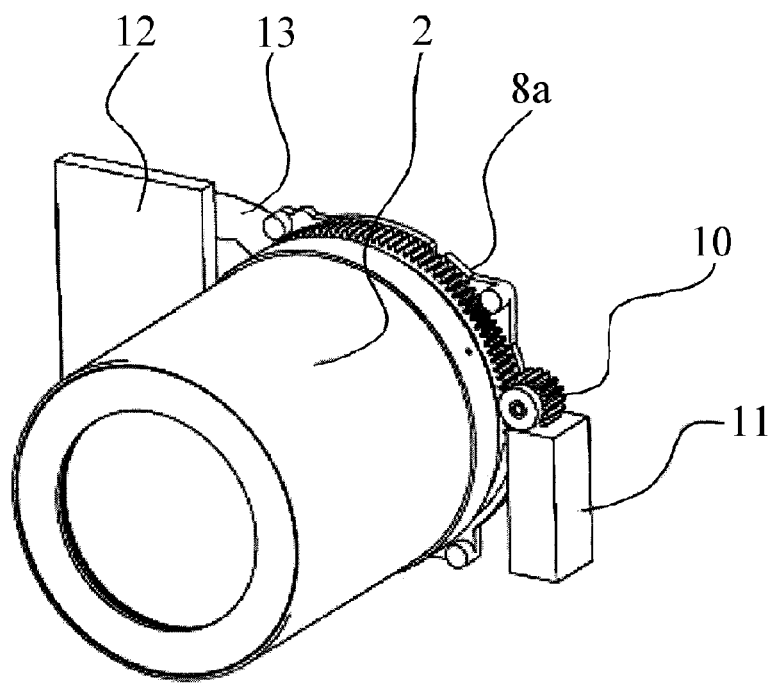
FIG. 4 is a perspective view of the lens barrel of the embodiment.

In FIG. 4, reference numeral 10 denotes a driving gear, and reference numeral 11 denotes a zoom motor. Reference numeral 12 denotes a main substrate, and reference numeral 13 denotes a flexible printed board. In FIG. 5, reference numeral 14 denotes the above-mentioned image pickup element holder. Reference numeral 15 denotes a voice coil motor that moves the fourth lens holder 6 in the optical axis direction.

Figure 16:
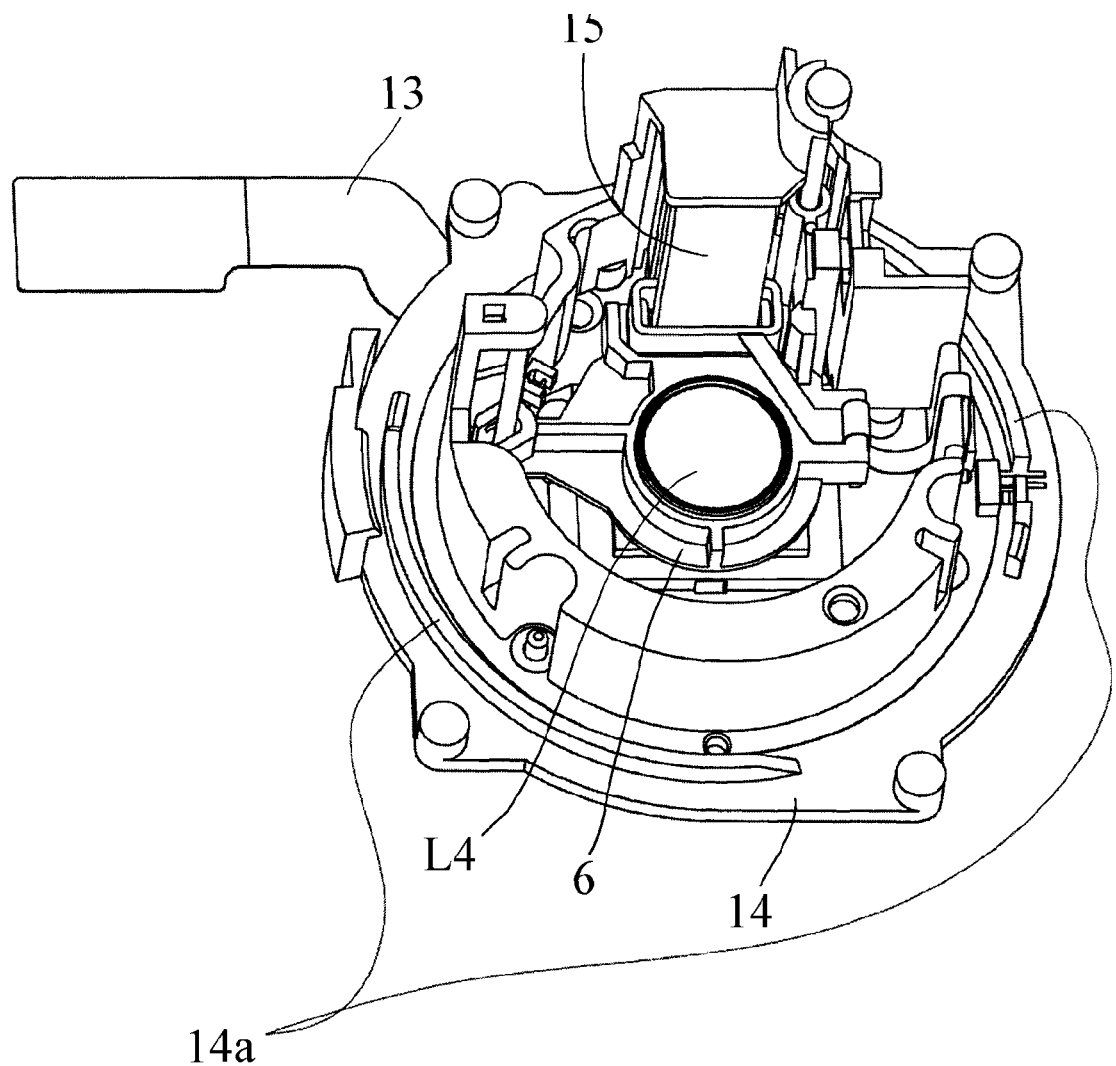
FIG. 16 is perspective view showing an image sensor holder impact receiving part in the lens barrel of the embodiment.

As shown in FIGS. 12 and 16, an image pickup element holder impact receiving portion 14*a* is formed on the image pickup element holder 14. Further, as shown in FIG. 6, an image pickup element holder stopper 14*b* is formed on the image pickup element holder 14.

The image pickup element holder 14 holds the fixed barrel 9, the driving gear 10, the zoom motor 11 and the voice coil motor 15, and is fixed to a main chassis (not shown) of the camera 1.

The main substrate 12 is connected to an image pickup element 26 mounted on an image pickup element plate 25 via wires (not shown). A CCD sensor or a CMOS sensor may be used as the image pickup element 26. The image pickup element 26 photoelectrically converts an object image formed by the image pickup optical system to outputs an image pickup signal. Image data is generated based on the image pickup signal.

Next, description will be made of operations of the lens barrel 2 thus configured. The zoom motor 11 energized by an electric current from the main substrate 12 via the flexible printed board 13 rotates the driving gear 10. The driving gear 10 engages with the gear portion 8*a* of the cam barrel 8, which rotates the cam barrel 8 at the outside of the fixed barrel 9.

When the cam barrel 8 is rotated, the first lens holder 3 whose first ball followers 3*a* engage with the first cam groove portions 8*b* of the cam barrel 8 is moved in the optical axis direction by lift of the first cam groove portions 8*b* while being guided by the first straight-guiding keys 9*c* of the fixed barrel 9.

The second lens holder 4 whose second cam pins 4*a* engage with the second cam groove portions 8*c* of the cam barrel 8 is moved in the optical axis direction by lift of the second cam groove portions 8*c* while being guided by the second straight groove portions 9*a* of the fixed barrel 9. The third lens holder 5 whose third cam pins 5*a* engage with the third cam groove portions 8*d* of the cam barrel 8 is moved in the optical axis direction by lift of the third cam groove portions 8*d* while being guided by the one guide bar 4*b*.

Moreover, the shutter unit 7 whose SH cam pins 7*a* engage with the SH cam groove portions 8*e* of the cam barrel 8 is moved in the optical axis direction by lift of the SH cam groove portions 8*e* while being guided by the one guide bar 4*b*.

When the cam barrel 8 whose cam barrel driving cam groove portions 8*g* engage with the fixed barrel ball followers 9*b* held by the fixed barrel 9 is rotated, the came barrel 8 is moved in the optical axis direction by the lift of the cam barrel driving cam groove portions 8*g* with respect to the fixed barrel 9. During the rotation of the cam barrel 8, the roller guiding portions 8*i* of the cam barrel 8 are guided in a direction of the rotation by the drum portions 9*ib* of the rollers 9*i* held by the fixed barrel 9.

The fourth lens unit L4 is moved in the optical axis direction by the voice coil motor 15.

Thus, the movement of the respective lens holders, the shutter unit 7 and the cam barrel 8 in the optical axis direction changes the lens barrel 2 from the retracted state shown in FIGS. 5 to 7 and 14 to the wide-angle state shown in FIGS. 8 to 10 and 15. Further rotation of the cam barrel 8 changes the lens barrel 2 to the telephoto state shown in FIGS. 11 to 13.

As described above, this embodiment presses the fixed barrel ball followers 9*b* and the rollers 9*i*, which are rolling bearings, with the biasing force against the cam barrel 8, which can suppress generation of the backlash in the radial direction between the cam barrel 8 and the fixed barrel 9 due to the manufacturing errors thereof. Therefore, this embodiment can improve rotational accuracy of the cam barrel 8 with respect to the fixed barrel 9, in other words, positional accuracy of the first to third lens units L1 to L3 and the shutter unit 7 in the optical axis direction. Moreover, this embodiment supports the cam barrel 8 rotatably with respect to the fixed barrel 9 by the rolling bearings, which can reduce the driving noise generated when the cam barrel 8 is rotationally driven.

Further, the roller guiding portions 8*i* of the cam barrel 8 are in contact with the drum portions 9*ib* of the rollers 9*i* so as to be movable (slidable) in the optical axis direction, which enables the movement of the cam barrel 8 in the optical axis direction between the retracted state and the wide-angle state. Therefore, this embodiment can reduce the length of the lens barrel 2 in the optical axis direction in the retracted state.

Furthermore, the cam barrel 8 does not move in the optical axis direction in the image pickup state between the telephoto state and the wide-angle state, and the rotation center axes of the rollers 9*i* extend in the direction orthogonal to the direction of the cam barrel lead angle. Therefore, the rollers 9*i* rotate when the cam barrel 8 rotates, which eliminates the relative movement of the roller guiding portions 8*i* and the rollers 9*i* with friction. Therefore, this embodiment can suppress increase in driving load for the cam barrel 8.

The description was made of the case where the cam barrel 8 corresponding to the second barrel member is disposed outside the fixed barrel 9 corresponding to the first barrel member in the above embodiment. However, the second barrel member may be disposed inside the first barrel member. In other words, the second barrel member may be disposed at any one of the inside and outside of the first barrel member.

Moreover, the description was made of the case where the fixed barrel 9 corresponding the first barrel member rotatably holds the fixed barrel ball followers 9b and the rollers 9i corresponding to the first and second rolling bearings. However, the second barrel member may rotatably hold the first and second rolling bearings.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Patent Application No. 2008-236688, filed on Sep. 16, 2008, which is hereby incorporated by reference herein in its entirety.

What is claimed is:

1. A lens apparatus comprising:
   a first barrel member;
   a second barrel member on which a cam for moving a lens unit in an optical axis direction is formed, the second barrel member being disposed inside or outside of the first barrel member and rotatable around an optical axis with respect to the first barrel member;
   a first rolling bearing configured to prevent relative displacements of the first and second barrel members in the optical axis direction and in a radial direction, the first rolling bearing being rotatable between the first and second barrel members; and
   a second rolling bearing configured to prevent the relative displacement of the first and second barrel members in the radial direction, the second rolling bearing being rotatable between the first and second barrel members,
   wherein the first rolling bearing and the second rolling bearing are arranged at positions away from each other in the optical axis direction between the first and second barrel members.

2. A lens apparatus according to claim 1,
   wherein the first rolling bearing is a ball bearing, and the second rolling bearing is a roller bearing.

3. A lens apparatus according to claim 1,
   wherein the first and second rolling bearings are rotatably held by one barrel member of the first and second barrel members, and
   wherein the one barrel member includes a biasing member which biases the first and second rolling bearings to another barrel member of the first and second barrel members.

4. A lens apparatus according to claim 1,
   wherein the first rolling bearing is rotatably held by one barrel member of the first and second barrel members,
   wherein another barrel member of the first and second barrel members includes a cam groove portion with which the first rolling bearing engages in the optical axis direction and in the radial direction, and
   wherein rotation of the second barrel member around the optical axis causes the cam groove portion to move the second barrel member in the optical axis direction with respect to the first barrel member.

5. A lens apparatus according to claim 4,
   wherein, in the optical axis direction, the second barrel member does not move with respect to the first barrel member in an image pickup state of the lens apparatus, and moves with respect to the first barrel member between a retracted state of the lens apparatus and an initial state of the image pickup state.

6. A lens apparatus according to claim 4,
   wherein the second rolling bearing is a roller bearing, and
   wherein, when the second barrel member moves in the optical axis direction with respect to the first barrel member, the other barrel member and the second rolling bearing relatively slide in the optical axis direction.

7. An image pickup apparatus comprising:
   a lens apparatus; and
   an image pickup part configured to capture an image of an object through the lens apparatus,
   wherein the lens apparatus comprises:
   a first barrel member;
   a second barrel member on which a cam for moving a lens unit in an optical axis direction is formed, the second barrel member being disposed inside or outside of the first barrel member and rotatable around an optical axis with respect to the first barrel member;
   a first rolling bearing configured to prevent relative displacements of the first and second barrel members in the optical axis direction and in a radial direction, the first rolling bearing being rotatable between the first and second barrel members; and
   a second rolling bearing configured to prevent the relative displacement of the first and second barrel members in the radial direction, the second rolling bearing being rotatable between the first and second barrel members,
   wherein the first rolling bearing and the second rolling bearing are arranged at positions away from each other in the optical axis direction between the first and second barrel members.

* * * * *